US005388205A

United States Patent [19]

Cantor et al.

[11] Patent Number: 5,388,205

[45] Date of Patent: Feb. 7, 1995

[54] APPARATUS AND METHOD OF ENCODING CONTROL DATA IN A COMPUTER GRAPHICS SYSTEM

[75] Inventors: Murray R. Cantor; John A. Cook, both of Austin, Tex.

[73] Assignee: International Business Machines Corporation, Armonk, N.Y.

[21] Appl. No.: 223,367

[22] Filed: Apr. 4, 1994

Related U.S. Application Data

[63] Continuation of Ser. No. 870,171, Apr. 16, 1992, abandoned, which is a continuation of Ser. No. 475,462, Feb. 5, 1990, abandoned.

[51] Int. Cl.[6] .......... G06F 9/22

[52] U.S. Cl. .......... 395/162

[58] Field of Search .......... 395/162, 163, 164, 165, 395/166, 155, 161; 345/121, 127, 147

[56] References Cited

U.S. PATENT DOCUMENTS

| | | | |
|---|---|---|---|
| 4,129,858 | 12/1978 | Hara | 340/324 |
| 4,475,104 | 10/1984 | Shen | 340/729 |
| 4,520,358 | 5/1985 | Makino | 340/799 |
| 4,580,135 | 4/1986 | Kummer et al. | 340/750 |
| 4,595,996 | 6/1986 | Morley et al. | 340/900 |
| 4,607,255 | 8/1986 | Fuchs et al. | 340/755 |
| 4,625,289 | 11/1986 | Rockwood | 364/522 |
| 4,639,865 | 1/1987 | Martin | 364/200 |
| 4,679,041 | 7/1987 | Fetter et al. | 340/747 |
| 4,701,863 | 10/1987 | Bruce | 364/518 |
| 4,745,407 | 5/1988 | Costello | 340/799 |
| 4,757,309 | 7/1988 | Bowater et al. | 340/703 |
| 4,794,527 | 12/1988 | Stewart et al. | 364/200 |
| 4,803,615 | 2/1989 | Johnson | 364/200 |
| 4,812,989 | 3/1989 | Maier et al. | 364/200 |
| 4,916,606 | 4/1990 | Yamaoka et al. | 364/200 |
| 4,933,847 | 6/1990 | Chau et al. | 364/200 |
| 4,944,034 | 7/1990 | Ohsawa | 364/522 |
| 4,958,275 | 9/1990 | Yokouchi | 364/200 |

FOREIGN PATENT DOCUMENTS

| | | |
|---|---|---|
| 0157912 | 12/1979 | European Pat. Off. . |
| 0330007 | 2/1989 | European Pat. Off. . |
| 0397995 | 3/1990 | European Pat. Off. . |
| 62-42279 | 2/1987 | Japan . |
| 62-42281 | 2/1987 | Japan . |

OTHER PUBLICATIONS

IBM-Technical Disclosure Bulletin, "Video Data Path in Color Raster Displays with Variable Pixel Data Structure", vol. 28, No. 11, Apr. 1986, L. Lumelsky, 4890–4893.

"Principles of Interactive Computer Graphics", Second Ed. MacGraw-Hill, New York, 1979, pp. 368–388, by W. W. Newman and R. F. Sproull.

*Primary Examiner*—Phu K. Nguyen

*Attorney, Agent, or Firm*—Mark E. McBurney

[57] ABSTRACT

An apparatus and a method of encoding a dirty bit within plural bit control data for controlling an operation by a computer graphics system to simultaneously indicate reset or clear of data for a pixel in the system to quickly update a frame on a screen in an animation application are disclosed. Flexibility of the encoding dirty bits and a trade-off among a relative size of a set of control data available for the system to control the operation are easily achieved by the apparatus and the method.

20 Claims, 3 Drawing Sheets

APPARATUS AND METHOD OF ENCODING CONTROL DATA IN A COMPUTER GRAPHICS SYSTEM

This is a continuation of application Ser. No. 07/870,171 filed Apr. 16, 1992, abandoned which is a continuation of application Ser. No. 07/475,462 filed Feb. 5, 1990, abandoned.

Background of the Invention

1. Technical Field

The present invention relates to an apparatus and a method of encoding plural bit control data for controlling plural operations in a computer graphics system, and more particularly, to an apparatus and a method of encoding bits within a control buffer in a computer graphics system which generates or manipulates images on a display screen in animation applications to quickly update a frame.

2. Background Art

In the computing industry, it is quite common to represent and convey information to a user through graphical representation. For example, in a computer aided design (CAD) system, three-dimensional objects may be modeled, reconfigured, and assembled on a two-dimensional cathode-ray tube (CRT) display to assist design engineers in their tasks. In displaying three-dimensional objects on a two-dimensional display, the computer system generating the display often includes not only a frame buffer for storing each pixel of image data to be displayed on the two-dimensional display screen, but also, one or more attribute buffers, such as a Z-buffer, for storing attribute data, such as Z-value or depth value, for each pixel on the screen. When the attribute buffer is a Z-buffer, the attribute data provide a mechanism used in algorithms for eliminating hidden surfaces in the projected two-dimensional image, so that a three-dimensional effect will be provided. (See William M. Newman and Robert F. Sproull, Principles of Interactive Computer Graphics, 2nd Ed., MacGraw-Hill Book Company, New York, 1979, pp. 369–370).

In addition, the computer graphics system includes a control buffer for storing control data to control operations in the system. A typical use of the control buffer is as a window ID buffer, in which is stored a window ID value for each pixel. Such an arrangement permits the display of independent windows on the display screen.

A sophisticated computer graphics system, which provides a higher resolution three-dimensional representation of an image on a two-dimensional screen, includes a large frame buffer, a large attribute buffer, such as a Z-buffer, and a large control buffer. Animation operations typically clear the frame buffer and the attribute buffers frequently. Animation is the presentation of a timed sequence of computed images which, when viewed, are perceived by the viewer as a moving picture. However, the larger the buffers are, the more time taken to reset or clear the data stored in the buffers. The consideration of the time to clear the attribute buffer is significant since the attribute buffer is often the largest of the buffers.

In a typical graphics application, animation plays an important part. The repetition rate of the animation sequence is bounded at the upper end by the limits of human perception, at roughly 30 Hz, and at the lower end by the ability of the hardware to perform the drawing necessary for one frame. For the typical computer graphics system, the frame buffer and the attribute buffer are cleared or reset to default values at the start of the drawing sequence for each frame. Often, the size of the attribute buffer is such that the time required to clear or reset data is a significant portion of the time to animate (one third or more of the time). The ability to reduce the percentage of the time for clearing or resetting translates into an improvement in the animation. That is, when the percentage is reduced, then either a more complex scene can be drawn at the same animation rate or the same type of scene can be drawn at a faster animation rate.

In the prior art, a single bit called a dirty bit has been used between drawing sequences to indicate reset or clear of the data stored in the attribute buffer. In the prior art, as shown in FIG. 1, data C0, C1, C2, and C3 stored in each pixel of the control buffer 7 is organized into two fields. One of the fields contains a single bit C3, which is the dirty bit D0. The other field contains the remainder of the bits C0, C1, and C2, and is shown in use as a window ID, W0, W1, and W2. Decode box 30 does not have any logic but has simple connections of the data from the buffer 7. The dirty bit D0 is interpreted by the system to mean "this pixel is cleared" or "this pixel is reset" when the dirty bit is a binary one. When an application requires clearing the attribute buffer for a region of the two-dimensional display, instead of writing a default value into each pixel of the attribute buffer, the single dirty bit field C3 is set in the corresponding two-dimensional region of the control buffer 7 and the attribute buffer contents are left untouched.

Although, the prior art technique shown in FIG.1 vastly reduces the time required to clear or reset the attribute buffer by placing a dirty bit field into the control buffer along with the window ID field, the prior art technique also reduces, by 50% or more, the potential number of the window IDs available for the system. In the example in FIG. 1, there are 4 bits C0, C1, C2, and C3 in each pixel of the control buffer 7. If all the bits were used to define the window ID field, there would be 16 possible values of window ID. However, only 3 bits C0, C1, and C2 of the control buffer 7 are used to define the window ID, permitting only 8 values. That is, only 8 of 16, or 50%, of the possible window IDs are available for the system to generate and control the windows on the display.

This reduction is a disadvantage when more windows are required by applications. Moreover, in the prior art, only one dirty bit is available for each pixel in the control buffer. A single dirty bit is insufficient when clearing plural attribute buffer pixels, for example, a depth value and a multiplicand for use in, blending colors, independently. Moreover, in the prior art all window IDs are associated with a dirty bit, when in most computer graphics systems not all hardware windows actually require the performance enhancement of the dirty bit.

SUMMARY OF THE INVENTION

In contrast to the prior art, it is an object of the present invention to provide an apparatus and a method or,encoding a dirty bit within plural bit control data in a computer graphics system without reducing the number of the control values, such as window IDS, available for the computer graphics system by percentages of 50% or more.

It is another object of the invention to provide an apparatus and a method of encoding plural dirty bit fields within plural bit control data in a computer graphics system.

Yet further, it is an object of the invention to provide an apparatus and a method of indicating multiple classes of window IDs or other control values, in which window IDs or values in one class are associated with encoded dirty bits and window IDs or values of another class are not associated with the dirty bits.

In accordance with the invention, there is provided a method of encoding plural bit control data in a computer graphics system, comprising generating a class bit from the plural bit control data to divide the plural bit control data into plural subsets; generating one control value from the plural bit control data of one of the subsets to control a first operation; and providing the control value with at least one control bit field to control a second operation.

According to the invention, if the class bit is generated from the second least significant bit field of the plural bit control data, the number of the control values available for the system to control the first operation, such as windowing on a display screen, is reduced by only 25%, and one third of the control values (window IDs) which belong to the one of the subsets have one control bit field, such as a dirty bit field, available to control the second operation, such as to indicate reset or invalidation of the attribute data for a pixel in the attribute buffer. The other two thirds of the control values (window IDs) which do not belong to the subset do not have the dirty bit field. But, in many graphics environments, not every application or process needs the higher performance permitted by dirty bits.

If the class bit is generated from the third least significant bit field of the plural bit control data, a first control bit field and a second control bit field are provided to indicate reset of two attribute values for a pixel independently. The number of the control values available for the system to control the first operation, such as windowing on a display screen, is reduced by 37.5% but one fifth of the control values which belong to the one of the subsets can have two dirty bit fields available to indicate invalidity of two attribute values for a pixel independently.

BRIEF DESCRIPTION OF THE DRAWINGS

For a more complete understanding of the present invention and further objects and advantages thereof, reference is now made to the following Best Mode of Carrying out the Invention taken in conjunction with the accompanying Drawings, in which.

BEST MODE OF CARRYING OUT THE INVENTION

Figure 2:
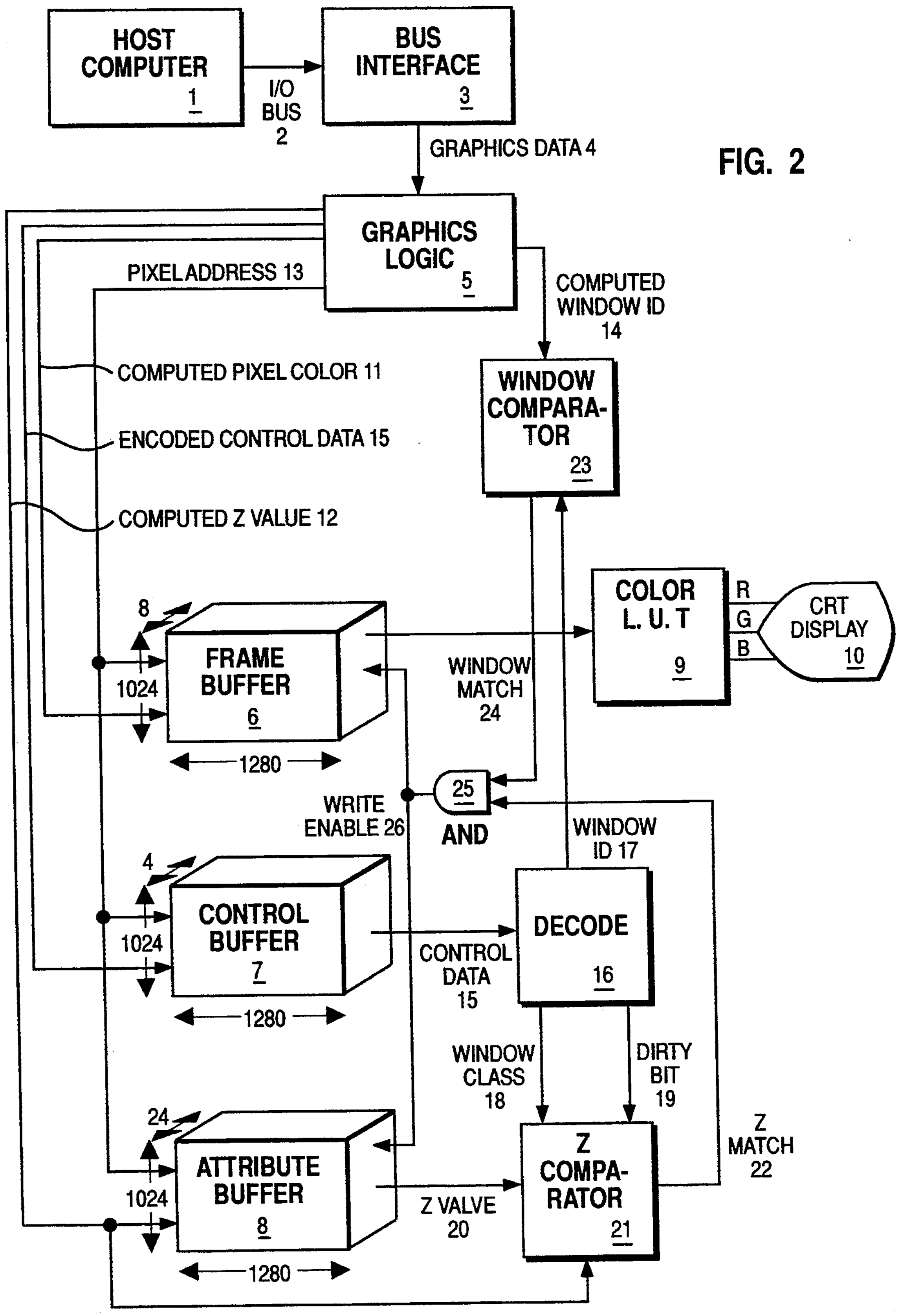
FIG. 2 is a block diagram illustrating a computer graphics system in which an apparatus and a method of the invention is used.

Referring to FIG. 2, to begin with, a computer graphics system in which an apparatus and a method of the invention can be used is explained. The system includes a host computer 1 which sends data and commands through an I/O bus 2 into a graphics logic 5. The graphics logic 5 may have a bus interface component 3 which extracts graphics data 4 from the I/O bus 2. The system includes a frame buffer 6, a control buffer 7, and an attribute buffer 8. The buffers 6, 7, and 8 are three-dimensional arrays of bits formed by stacking a number of two-dimensional bit planes of the same size in a fashion preserving the orientation and alignment. Each bit plane is a rectangular two-dimensional array of bits. In this system, the bit plane is comprised of 1024×1280 bits, and the numbers of the bit planes being stacked to form the frame buffer 6, the control buffer 7, and the attribute buffer 8 are eight, four, and twenty four, respectively. A pixel is the concatenation of the corresponding individual bits of the stacked planes at a particular address in the same two-dimensional coordinate system of the planes.

The frame buffer 6 stores pixel colors which represent the image to be displayed on the display screen of a CRT display 10. Each pixel data from the frame buffer 6 may pass through a color look-up table 9 before being resolved into the individual color components supplied to the CRT display 10.

The control buffer 7 stores control data 15 from the logic 5 encoded by an apparatus and a method of the present invention, which is passed to a decode logic 16. The decode logic, as described in FIGS. 3 and 4 in connection with the embodiments of the invention, converts the control data 15 into a window ID 17, a window class ID 18, and a dirty bit 19. As explained later in connection with the embodiments, the particular method of encoding is flexible, as are the ratio of window IDs of one class to window IDs of another. Similarly, the number of dirty bits is flexible, as is the total number of useful control values, such as window IDs, resolved from the encoded control data 15. Instead of the window IDs, the control buffer 7 may store control data for other operations.

The attribute buffer 8 is used to store Z-values 20. The Z-values are used to eliminate hidden surfaces of three-dimensional objects when projected and displayed as two-dimensional images. The details of the use of the Z-value are well discussed in the above referenced article by W. M. Newman and R. F. Sproull. Instead of Z-values, the attribute buffer might store other types of pixel data, for example, multiplicands used in blending of colors. In such a case, the attribute buffer is called an alpha buffer or alpha blending buffer.

The graphic logic 5 computes several values, including the computed pixel color 11, the computed Z-value 12, the pixel address 13, the control data 15 by a method of the invention and the computed window ID 14. The pixel address 13 is presented to each of the buffers 6, 7, and 8. Each of the control buffer 7 and the attribute buffer 8 produces the appropriate pixel of control data 15 or Z-value 20, respectively.

One part of the graphics subsystem takes the window ID 17 produced by the control data decode logic 16, and compares it in a window comparator 23 with the computed window ID 14 from the graphics logic 5. The computed match of the values 24 must be true before the computed pixel color 11 can replace the pixel stored in the frame buffer 6. Another part of the graphics subsystem takes the Z-value 20 and compares it in a Z-comparator 21 with the computed Z-value 12. The computation of Z match value 22 in the comparator 21 depends on several conditions. If the window ID class 18 is not correct, then the dirty bit 19 is ignored and a comparison is made between the Z-value 20 and the computed Z-value 12, and if the computed Z-value 12 lies "in front of" the stored Z-value 20, the Z match value 22 is set true. If the computed Z-value 12 lies "behind" the stored Z-value 20, the value 22 is set not true. If the window ID class 18 is correct and the dirty bit 19 is true, then the Z match value 22 is also set true. If the dirty bit 19 is not true, then the same comparison between the stored Z-value 20 and the computed Z-value 12 is made to determine if the computed Z-value 12 lies "in front of" or "behind" the stored Z-value 20. The two match values 22 and 24 are combined in a Boolean AND circuit 25 and used to create a write enable 26, which permits the frame buffer 6 and the attribute buffer 8 to be updated with the computed pixel color 11 and the computed Z-value 12, respectively.

Figure 1:
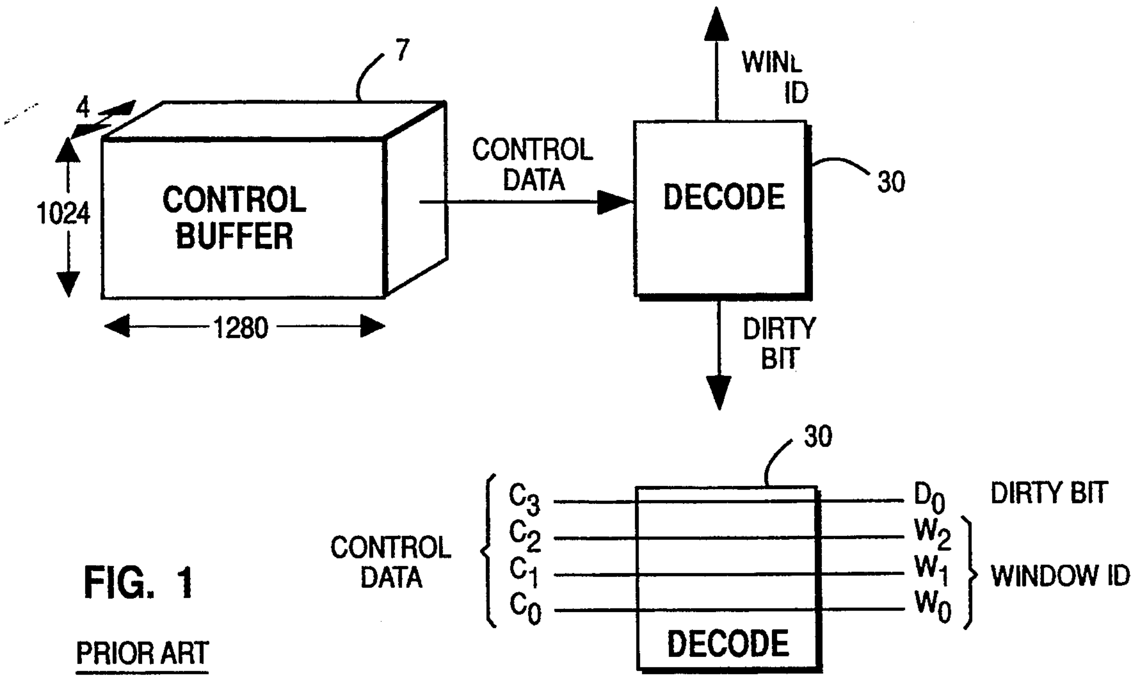
FIG. 1 PRIOR ART
FIG. 1 is a block diagram illustrating a prior art method of encoding a dirty bit in window ID buffer.
Figure 3:
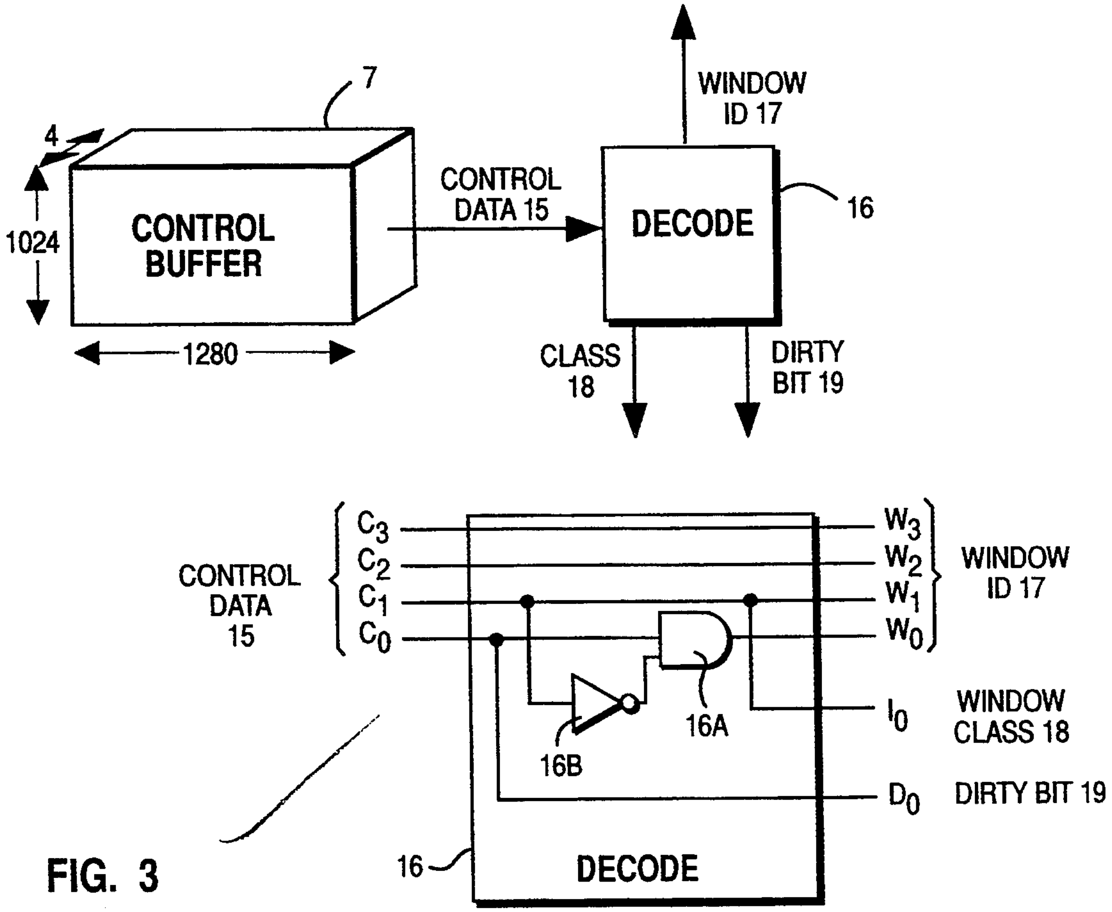
FIG. 3 is a block diagram illustrating a logic circuit to explain an encoding apparatus and method according to a first embodiment of the invention.

Referring to FIG. 3 as well as FIG. 2, an encoding apparatus and a method according to a first embodiment of the invention are explained. Note that use of the encoding method of the invention results in the absence of a dedicated field in the control buffer used as a dirty bit that the prior art method shown in FIG. 1 contains. The control buffer 7 contains four bit control data C0, C1, C2, and C3 (Ci) for each pixel. The encoding is accomplished using Boolean combinational logic involving the four bits Ci. The combinational logic produces outputs which provide a window ID, an indication as whether the window ID that was computed has an associated dirty bit (that is, a window class ID), and the value of the dirty bit if the class is appropriate. The window ID is composed of bits W0, W1, W2, and W3. The Class ID is I0. The dirty bit is D0. The combinational encoding used by the first embodiment is:

| | | |
|---|---|---|
| WINDOW ID: | W3 = C3 | |
| | W2 = C2 | |
| | W1 = C1 | |
| | W0 = ((not C1) and C0) | |
| CLASS ID: | I0 = C1 | |
| DIRTY BIT: | D0 = C0 | when Class ID = 1 |
| | D0 invalid | when Class ID = 0 |

According to the encoding method, the number of window IDs available for the system is 12, that is, four first class window IDs (0010, 0110, 1010, 1110) and eight second class window IDs (0000, 0001, 0100, 0101, 1000, 1001, 1100, 1101), which is a reduction of only 25% from possible 16. It can be seen that these Ids represent ordered n-tuples, or sets of ordered number, i.e. "n" sets of numbers detendent upon sequence. The invention defines two classes of window ID, the first category having a dirty bit to indicate reset or invalidity of the data in the attribute buffer and the second category having no dirty bit. But, in many graphics environments, not every application or process needs the higher performance permitted by dirty bits. On the other hand, more windows are needed when the system concurrently runs more applications on the same screen.

When a new frame is drawn on a window of the first class, the graphics logic 5, firstly, sets the dirty bit D0 (C0) of the control data 15 stored in the control buffer 7 true instead of clearing the attribute buffer 8. It saves much time because clearing the attribute buffer 8 before drawing a new frame takes up a lot of time of the drawing operations and such a clearing operation is eliminated by just setting the dirty bit true.

The decoding of the 4-bit control data 15, C0, C1, C2 and C3 by the decode logic 16 to produce the window ID 17, W0, W1, W2 and W3, the class ID 18, I0, and dirty bit 19, D0 is shown in FIG. 3. In the logic 16, W1, W2, and W3 are directly connected to C1, C2, and C3, respectively. W0 is connected to an output of an AND gate 16A whose two inputs are connected to C1 through an invert logic 16B and directly to C0, respectively. I0 is directly connected to C1. D0 is directly connected to C0.

According to the invention, many other encodings can be accomplished, to produce a different ratio of the two categories of window ID, to produce different numbers of classes of window IDs, and to produce plural dirty bits if plural attribute buffers are present in the computer graphics system.

Figure 4:
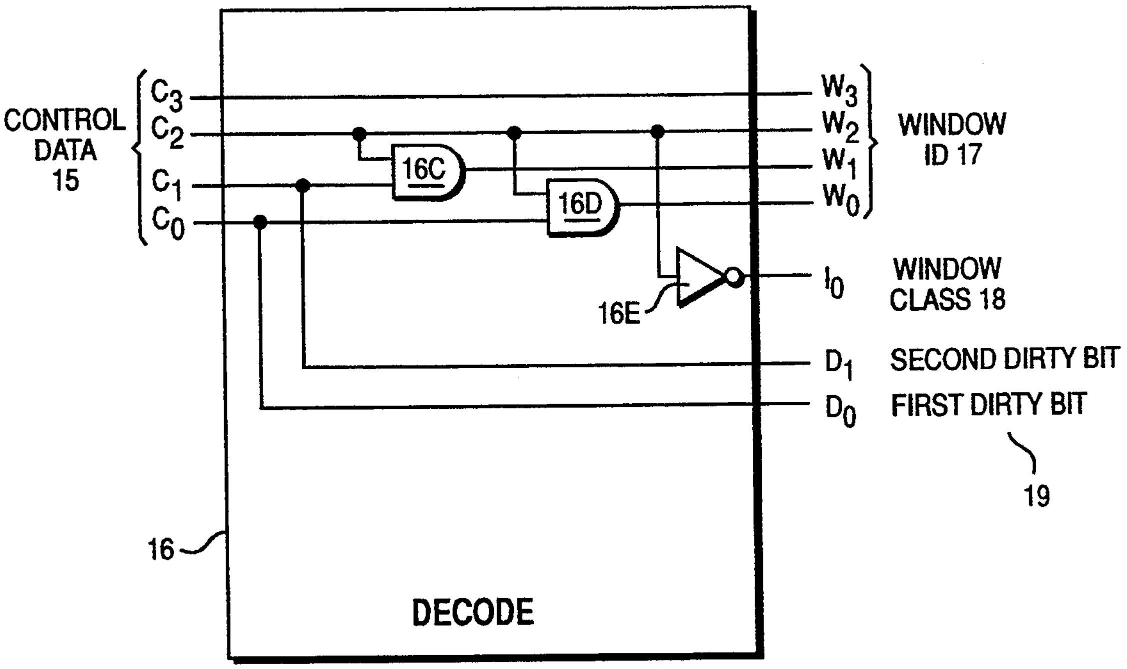
FIG. 4 is a block diagram illustrating a logic circuit to explain an encoding apparatus and method according to a second embodiment of the invention.

Referring to FIG. 4, an encoding apparatus and a method according to a second embodiment of the invention are explained. The combinational equations for encoding in this case are:

| | | |
|---|---|---|
| WINDOW ID: | W3 = C3 | |
| | W2 = C2 | |
| | W1 = C2 and C1 | |
| | W0 = C2 and C0 | |
| CLASS ID: | I0 = (not C2) | |
| DIRTY BIT: | D1 = C1 | when Class ID = 1 |
| | D0 = C0 | when Class ID = 1 |
| | D1, D0 invalid | when Class ID = 0 |

The number of window iDs available for the system in this embodiment is 10, that is, two first class window IDs (0000, 1000), and eight second class window IDs (0100, 0101, 0110, 0111, 1100, 1101, 1110, 1111), which is a reduction by 37.5% from the possible 16. The first class has two independent dirty bits DO and D1 associated with each window ID. The two dirty bits DO and D1 are useful when the computer graphics system has two attribute buffers, for example, a Z-buffer and an alpha buffer and needs to clear the two attribute data, a Z-value and a multiplicand data, independently. The second class has no dirty bits associated with the window ID.

FIG. 4 shows a decode logic 16 to produce two dirty bits 19, DO and D1, a window ID 17, W0, W1, W2, and W3, and a class ID 18, I0 from the 4-bit control data 15, C0, C1, C2, and C3 encoded by the method of the second embodiment. The logic 16 includes two AND gates 16C, 16D and an invert logic 16E. In the logic 16 of FIG.4, W2 and W3 are directly connected to C2 and C3, respectively. W1 is connected to an output of the AND gate 16C whose inputs are connected to C1 and C2. W0 is connected to an output of the AND gate 16D whose inputs are connected to C0 and C2. I0 is connected to C2 through the invert logic 16E. D0 and D1 are connected to CO and C1, respectively.

The flexibility of the encoding and the trade-off among the relative size of the sets of control values is easily achieved by the method of the invention. It is contemplated that many changes and modifications may be made, by one of ordinary skill in the art, to the elements of the invention without departing from the spirit and scope of the invention.

What is claimed is:

1. A method of displaying images on a computer graphics system by encoding and decoding plural bit control data input to a decode logic circuit included therein, comprising the steps of:

converting, by said decode logic circuit, a first bit from the plural bit control data into a class bit for defining plural subsets of said plural bit control data;

designating a second bit of said plural bit control data as a control bit field to control a reset operation, the validity of said control bit field being dependent upon said class bit;

controlling a window identification operation by outputting a first class of values, corresponding to one of the plural subsets, wherein said class bit indicates that said second bit is valid and a reset operation may be implemented; and controlling said window identification operation by outputting a second class of values, corresponding to another one of the plural subsets, wherein said class bit indicates that said second bit is invalid and a reset operation may not be implemented.

2. The method according to claim 1 further comprising a step of:

outputting from said decode logic circuit a greater number of bits to control the first operation and the second operation than are input to said decode logic circuit by said plural bit control data.

3. A method of displaying images on a computer graphics system by encoding and decoding plural bit control data, input to a decode logic circuit, comprising the steps of:

controlling a class designation operation to indicate whether simultaneous reset of attribute data is provided for pixels in an attribute buffer in said computer graphics system by converting a first bit of said plural bit control data;

outputting a first subset of the plural bit control data from said decode logic circuit to control a window identification operation, said first subset being of a first class including said first bit and being dependent upon a value thereof to indicate that simultaneous reset of the attribute data is provided, said first subset being configured as an ordered n-tuple;

outputting a second subset of the plural bit control data from said decode logic circuit to control said window identification operation, said second subset being of a second class including said first bit and being dependent upon the value thereof to indicate that simultaneous reset of the attribute data is not provided, said second subset being configured as an ordered n-tuple;

designating, as one control value for controlling a reset operation, a second bit of the plural bit control data of the subset which has a predetermined position in the ordered n-tuple; and setting one binary value at a position other than said predetermined position in the ordered n-tuple of the subset and outputting a signal from said decode logic circuit to indicate reset of the attribute data in the attribute buffer only when said first bit is of a predetermined value.

4. The method according to claim 3 further comprising steps of:

determining a second subset of the plural bit control data having the another binary value at the same predetermined position in the ordered n-tuple; and identifying, as an individual control value for controlling the operation, each of the positions of the ordered n-tuple of the second subset.

5. The method according to claim 3 further comprising steps of:

storing, in a frame buffer, image data for each pixel being displayed on a display screen;

storing attribute data for each pixel in the attribute; and storing the plural bit control data for each pixel in a control buffer to control the operation by the computer graphical system.

6. The method according to claim 3 wherein the attribute data is a depth value and the attribute buffer is configured as a Z-buffer for storing the depth value to display a three-dimensional representation of an image on a two-dimensional display screen.

7. The method according to claim 3 wherein the attribute data is a multiplicand data for use in blending colors for a pixel and the attribute buffer is configured as an alpha buffer for storing the multiplicand data.

8. The method according to claim 3 wherein the control value is a window ID and the operation is to display an independent window on a display screen.

9. The method according to claim 3 wherein the predetermined position in said ordered n-tuple is the second least significant bit filed in the plural bit control data and a binary one at the least significant bit field in the ordered n-tuple of the subset indicates reset of the attribute data for a pixel in the attribute buffer.

10. The method according to claim 3 wherein the predetermined position in said ordered n-tuple is the third least significant bit field in the plural bit control data and a binary one in the least significant bit field and a binary one in the second least significant bit field in the ordered n-tuple of the subset indicate reset of two different attribute data for a pixel independently.

11. An apparatus, included within a computer graphics system, for encoding and decoding plural bit control data input to a decode logic circuit included within said computer graphics system, comprising:

means for converting, by said decode logic circuit a first bit from the plural bit control data into a class bit for defining plural subsets of said plural bit control data;

means for designating a second bit of said plural bit control data as a control bit field to control a reset operation, the validity of said control bit field being dependent upon said class bit;

means for controlling a window identification operation by outputting, from said decode logic circuit, a first class of control values corresponding to one of the plural subsets, wherein said class bit indicates that said second bit is valid and a reset operation may be implemented; and means for controlling said window identification operation by outputting a second class of values, corresponding to another one of the plural subsets, wherein said class bit indicates that said second bit is invalid and a reset operation may not be implemented.

12. The apparatus according to claim 11 further comprising:

means for outputting from said decode logic circuit a greater number of bits to control first operation and the second operation than are input to said decode logic circuit by plural bit control data.

13. An apparatus, included within a computer graphics system, for encoding and decoding plural bit control data, input to a decode logic circuit, comprising:

means for controlling a class designation operation to indicate whether simultaneous reset of attribute data is provided for pixels in an attribute buffer in said computer graphics system by converting a first bit of said plural bit control data means for outputting a first subset of the plural bit control data from said decode logic circuit to control a window identification operation, said first subset being of a first class including said first bit for and being dependent upon a value thereof to indicate that simultaneous reset of the attribute data is provided, said first subset being configured as an ordered n-tuple;

means for outputting a second subset of the plural bit control data from said decode logic circuit to control said windows identification operation, said second subset being of a second class including said first bit and being dependent upon the value thereof to indicate that simultaneous reset of the attribute data is not provided, said second subset being configured as an ordered n-tuple;

means for designating, as one control value for controlling a reset operation, a second of the plural bit control data of the subset which has a predetermined position in the ordered n-tuple; and means for setting one binary value at a position other than said predetermined position in the ordered n-tuple of the subset and outputting a signal from said decode logic circuit to indicate reset of the attribute data in the attribute buffer only when said first bit is of a predetermined value.

14. The apparatus according to claim 13 further comprising:

means for determining a second subset of the plural bit control data having another binary value at the same predetermined position in the ordered n-tuple; and means for identifying, as an individual control value for controlling the operation, each of the positions of the ordered n-tuple data of the second subset.

15. The apparatus according to claim 13 further comprising:

means for storing, in a frame buffer, image data for each pixel being displayed on a display screen;

means for storing attribute data for each pixel in the attribute buffer; and mean for storing the plural bit control data for each pixel in a control buffer to control the operation by the computer graphics system.

16. The apparatus according to claim 13 wherein the attribute data is a depth value and the attribute buffer is configured as a Z-buffer for storing the depth value to display a three-dimensional representation of an image on a two-dimensional display screen.

17. The apparatus according to claim 13 wherein the attribute data is a multiplicand data for use in blending colors for a pixel and the attribute buffer is configured as an alpha buffer for storing the multiplicand data.

18. The apparatus according to claim 13 wherein the control value is a window ID and the operation is to display an independent window on a display screen.

19. The apparatus according to claim 13 wherein the predetermined position in said ordered n-tuple is the second least significant bit field in the plural bit control data and a binary one at the least significant bit field in the ordered n-tuple of the subset indicates rest of the attribute data for a pixel in the attribute buffer.

20. The apparatus according to claim 13 wherein the predetermined position in said ordered n-tuple is the third least significant bit field in the bit control data and a binary one in the least significant bit field and a binary one in the second least significant bit field in the ordered n-tuple of the subset indicate reset of two different attribute data for a pixel independently.

* * * * *

UNITED STATES PATENT AND TRADEMARK OFFICE

CERTIFICATE OF CORRECTION

PATENT NO. : 5,388,205

DATED : February 7, 1995

INVENTOR(S) : Murray R. Cantor and John A. Cook

It is certified that error appears in the above-indentified patent and that said Letters Patent is hereby corrected as shown below:

Col. 2, line 64, after "or" delete ".";

Col. 7, line 64, delete "the" first occurrence;

Col. 8, line 5, after "attribute" second occurrence, insert --buffer--;

line 24, delete "filed", insert --field--;

line 53, after "control" insert --the--;

line 55, after "by" insert --said--.

Col. 10, line 19, delete "rest", insert --reset--, and line 33, after "the" insert --plural--.

Signed and Sealed this

Thirteenth Day of August, 1996

Attest:

Bruce Lehman

BRUCE LEHMAN

*Attesting Officer* *Commissioner of Patents and Trademarks*